United States Patent
Shimizu et al.

(10) Patent No.: US 7,373,531 B2
(45) Date of Patent: May 13, 2008

(54) SIGNAL DETECTION METHOD, FREQUENCY DETECTION METHOD, POWER CONSUMPTION CONTROL METHOD, SIGNAL DETECTING DEVICE, FREQUENCY DETECTING DEVICE, POWER CONSUMPTION CONTROL DEVICE AND ELECTRONIC APPARATUS

(75) Inventors: Katsuya Shimizu, Kasugai (JP); Hiroko Kinoshita, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 318 days.

(21) Appl. No.: 11/122,123

(22) Filed: May 5, 2005

(65) Prior Publication Data

US 2006/0156044 A1 Jul. 13, 2006

(30) Foreign Application Priority Data

Jan. 11, 2005 (JP) ............................. 2005-004532

(51) Int. Cl.
*G06F 1/00* (2006.01)
*G06F 11/30* (2006.01)

(52) U.S. Cl. .................................... 713/300; 713/340

(58) Field of Classification Search ............... 713/300, 713/340

See application file for complete search history.

(56) References Cited

U.S. PATENT DOCUMENTS

| | | | | |
|---|---|---|---|---|
| 5,218,247 A | * | 6/1993 | Ito et al. | 326/68 |
| 5,225,717 A | * | 7/1993 | Shiomi et al. | 326/66 |
| 5,296,757 A | * | 3/1994 | Koizumi | 326/21 |
| 6,008,686 A | * | 12/1999 | Suda | 327/513 |
| 6,765,433 B1 | | 7/2004 | Kao | |
| 2002/0145477 A1 | | 10/2002 | Marten | |
| 2003/0051177 A1 | | 3/2003 | Koo | |
| 2004/0168095 A1 | | 8/2004 | Yeh | |
| 2004/0257122 A1 | * | 12/2004 | Mori | 327/78 |
| 2004/0257159 A1 | * | 12/2004 | Slamowitz | 330/253 |

FOREIGN PATENT DOCUMENTS

| | | |
|---|---|---|
| JP | 62-106815 | 7/1987 |
| JP | 2000-224015 | 8/2000 |

\* cited by examiner

*Primary Examiner*—Chun Cao
*Assistant Examiner*—Michael Wang
(74) *Attorney, Agent, or Firm*—Arent Fox LLP

(57) ABSTRACT

A power consumption control device for detecting output of a pulse signal from an output terminal of an oscillator as an operation monitoring target and outputting a power consumption reduction signal when the pulse signal is not detected in a predetermined period of time, includes a p-type transistor and an n-type transistor which are connected in series and have a gate to which the output terminal is connected, and detecting means for detecting a through current flowing through the p-type transistor and n-type transistor, and outputs a power consumption reduction signal when the through current is not detected in a predetermined period of time.

13 Claims, 7 Drawing Sheets

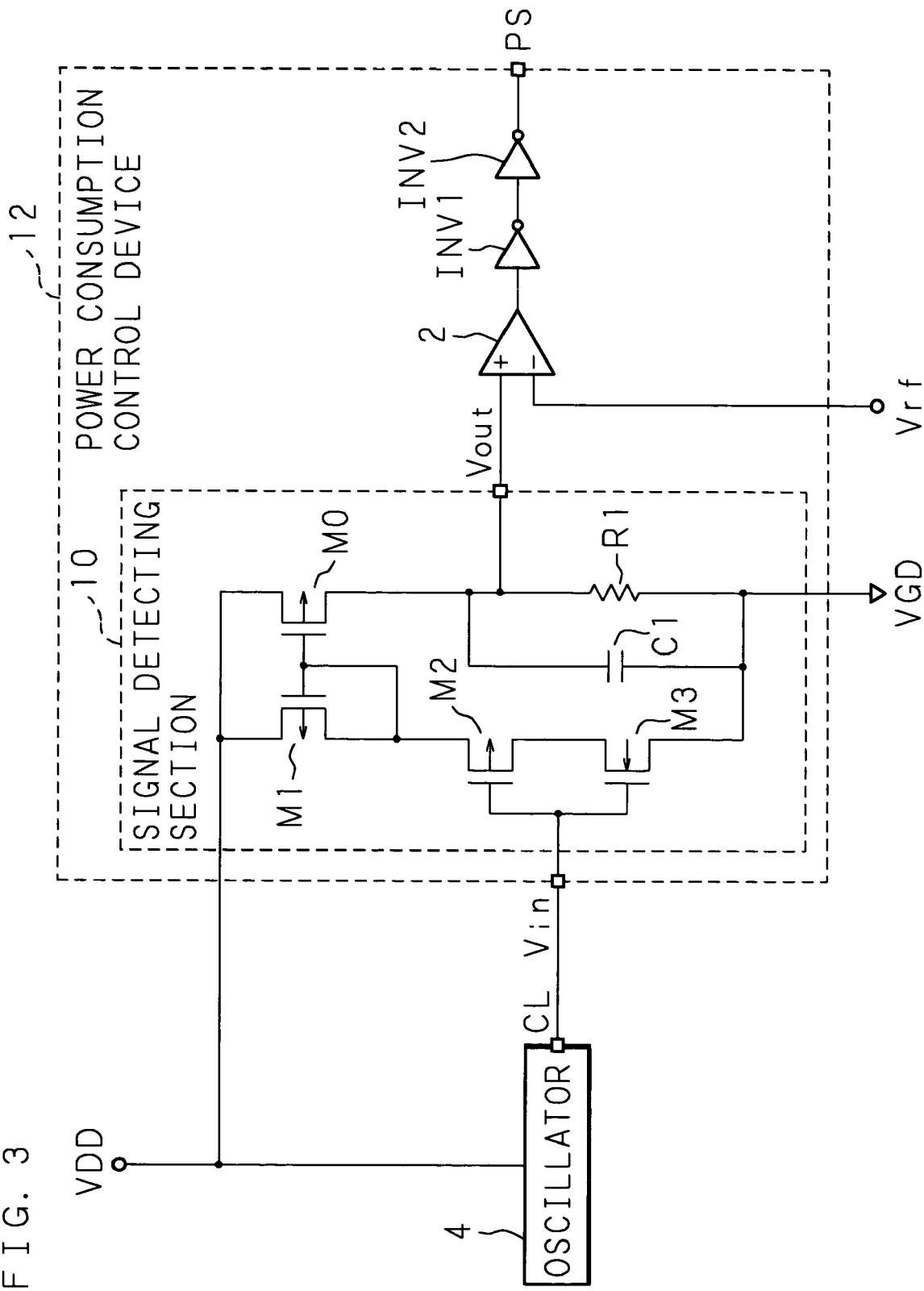

SIGNAL DETECTION METHOD, FREQUENCY DETECTION METHOD, POWER CONSUMPTION CONTROL METHOD, SIGNAL DETECTING DEVICE, FREQUENCY DETECTING DEVICE, POWER CONSUMPTION CONTROL DEVICE AND ELECTRONIC APPARATUS

CROSS-REFERENCE TO RELATED APPLICATION

This non-provisional application claims priority under 35 U.S.C. §119(a) on Patent Application No. 2005-004532 filed in Japan on Jan. 11, 2005, the entire contents of which are hereby incorporated by reference.

BACKGROUND OF THE INVENTION

The present invention relates to a signal detection method, a power consumption control method, a signal detecting device and a power consumption control device that detect input of a signal to an input terminal; a frequency detection method and a frequency detecting device that detect the frequency of the signal; a signal detection method, a power consumption control method, a signal detecting device and a power consumption control device that detect whether a signal inputted to an input terminal is in a first state in which the signal repeatedly goes to a high level and a low level alternately, or in a second state in which the signal is kept at a high level or a low level; and an electronic apparatus comprising the power consumption control device.

In an apparatus for processing a signal inputted from outside, when a signal to be processed is not inputted, the apparatus is not operating, but a bias current or the like continues to flow, and therefore electric power is often wastefully consumed. For example, when no signal is inputted, a pre-scaler used in a PLL (Phase-Locked Loop) or the like is not operating, but a bias current continues to flow.

In order to reduce such wasteful power consumption, the state of the signal is monitored, and when the signal is stopped, a power consumption reduction signal is outputted to block the bias current or the like (see Japanese Patent Application Laid Open No. 2000-224015). For example, with the use of a power consumption control device that outputs a power save signal (power consumption reduction signal) when it detects that no signal is outputted to a pre-scaler from an oscillator, an attempt is made to reduce power consumption by blocking the bias current in the pre-scaler when it is not operating.

FIG. 1 is a circuit diagram showing the essential structure of an electronic apparatus comprising a power consumption control device. A power consumption control device 6 is connected to an output terminal CL of an oscillator 4 which is an operation monitoring target. A clock signal similar to a signal supplied to a pre-scaler, not shown, is outputted from the output terminal CL. In the power consumption control device 6, one of the terminals of a resistor R8 is connected via an input terminal Vin to the output terminal CL of the oscillator 4, and a capacitor C8 is connected between the other terminal of the resistor R8 and a ground terminal VGD. The node of the resistor R8 and capacitor C8 is connected to a non-inverted input terminal of a comparator 2. Moreover, a reference voltage terminal Vrf is connected to an inverted input terminal of the comparator 2, and the output terminal of the comparator 2 is connected to a power save signal output terminal PS through two inverters INV1 and INV2. The power save signal output terminal PS can be connected, for example, to a power supply device (not shown) to stop power supply to the pre-scaler from the power supply device or reduce the supply voltage, or can be connected, for example, to a pre-scaler (not shown) to give an operation stop signal or a standby signal to the pre-scaler.

In the example of FIG. 1, the clock signal outputted from the CL terminal of the oscillator 4 is integrated by the resistor R8 and capacitor C8 and then outputted to the comparator 2, so when the clock signal is inputted and repeatedly going to a high state and a low state alternately, the power save signal goes high. When the clock signal is stopped in a low state, the power save signal goes low. However, when the clock signal is stopped in a high state, the power save signal goes high similarly to the input of the clock signal, and thus there is the problem that power saving cannot be achieved.

As a method of solving this problem, there is a method in which the DC component of the clock signal outputted from the oscillator 4 is cut. FIG. 2 is a circuit diagram showing the essential structure of an electronic apparatus comprising other power consumption control device in which a capacitor C9 is connected between the above-described input terminal Vin and resistor R8 of the power consumption control device 8. Note that the circuit shown in FIG. 2 has the same structure as the circuit of FIG. 1, except for the capacitor C9. In the example shown in FIG. 2, since the DC component of the clock signal inputted to the input terminal Vin of the power consumption control device 8 is cut, even when the clock signal is stopped in a high state, the power save signal is low. However, since there is no path for actively discharging the charge accumulated in the capacitor C8, it will take a long time until the power save signal goes low after the clock signal was stopped in a high state, and consequently there is the problem that power saving cannot be achieved quickly.

Further, in the Japanese Patent Application Laid Open No. 2000-224015, since different circuits are used to detect the clock signal stopped in a high state and the clock signal stopped in a low state, respectively, it is possible to certainly output a power save signal irrespective of the stopped state of the clock signal. However, this technique has the problem that the circuit becomes larger in size.

BRIEF SUMMARY OF THE INVENTION

The present invention has been made with the aim of solving the above problems, and it is an object of the present invention to provide a signal detection method and a signal detecting device, capable of detecting the presence or absence of an input signal by a simple structure by applying a signal inputted to an input terminal to the gates of a p-type transistor and an n-type transistor connected in series, for example, to detect a through current.

Another object of the present invention is to provide a signal detection method and a signal detecting device, capable of detecting whether a signal inputted to an input terminal is in a first state in which the signal repeatedly goes to a high level and a low level alternately, or in a second state in which the signal is kept at a high level or a low level, by a simple structure by applying the signal to the gates of a p-type transistor and an n-type transistor connected in series, for example, to detect a through current, and determining that the signal is in the first state when the through current is detected, or determining that the signal is in the second state when the through current is not detected in a predetermined period of time.

Still another object of the present invention is to provide a frequency detection method and a frequency detecting device, capable of detecting the frequency of a signal by a simple structure by applying a signal inputted to an input terminal to the gates of a p-type transistor and an n-type transistor connected in series, for example, to detect a through current, and detecting the frequency of the signal based on the detected through current.

Yet another object of the present invention is to provide a power consumption control method and a power consumption control device, capable of detecting whether an operation monitoring target is operating or is stopped and outputting a power consumption reduction signal by a simple structure by applying a signal inputted to an input terminal to the gates of a p-type transistor and an n-type transistor connected in series, for example, to detect a through current flowing through the p-type transistor and n-type transistor, and outputting a power consumption reduction signal when the through current is not detected in a predetermined period of time.

A further object of the present invention is to provide a power consumption control method and a power consumption control device, capable of detecting an operation state of an operation monitoring target and outputting a power consumption reduction signal according to the operation state by a simple structure by applying a signal inputted to an input terminal to the gates of a p-type transistor and an n-type transistor connected in series, for example, to detect a through current flowing through the p-type transistor and n-type transistor, and determining that the signal is in a first state in which the signal repeatedly goes to a high level and a low level alternately when the through current is detected, or determining that the signal is in a second state in which the signal is kept at a high level or a low level when the through current is not detected in a predetermined period of time.

A further object of the present invention is to provide an electronic apparatus capable of executing a power supply stopping process or a power supply reducing process, according to a power consumption reduction signal outputted from the power consumption control device.

A signal detection method according to the present invention is a signal detection method for detecting input of a signal to an input terminal, and characterized by comprising: detecting a through current flowing through a circuit to which the signal is inputted; and detecting input of the signal, based on whether or not the through current flowed through the circuit.

A signal detection method according to the present invention is a signal detection method for detecting whether a signal inputted to an input terminal is in a first state in which the signal repeatedly goes to a high level and a low level alternately, or in a second state in which the signal is kept at a high level or a low level, and characterized by comprising: detecting a through current flowing through a circuit to which the signal is inputted; determining that the signal is in the first state when the through current is detected; and determining that the signal is in the second state when the through current is not detected in a predetermined period of time.

A signal detection method according to the present invention is characterized in that the circuit includes a p-type transistor and an n-type transistor with gates to which the signal is inputted.

A frequency detection method according to the present invention is a frequency detection method for detecting a frequency of a signal inputted to an input terminal, and characterized by comprising: detecting a through current flowing through a circuit to which the signal is inputted; and detecting the frequency based on the detected through current.

A frequency detection method according to the present invention is characterized in that the circuit includes a p-type transistor and an n-type transistor with gates to which the signal is inputted.

A power consumption control method according to the present invention is a power consumption control method comprising detecting input of a signal outputted from an operation monitoring target to an input terminal, and outputting a power consumption reduction signal when the signal is not detected in a predetermined period of time, and characterized by comprising: detecting a through current flowing through a circuit to which the signal is inputted; and outputting the power consumption reduction signal when the through current is not detected in a predetermined period of time.

A power consumption control method according to the present invention is a power consumption control method comprising determining whether a signal outputted from an operation monitoring target and inputted to an input terminal is in a first state in which the signal repeatedly goes to a high level and a low level alternately, or in a second state in which the signal is kept at a high level or a low level, and outputting a power consumption reduction signal when the signal is determined as being in the second state, and characterized by comprising: detecting a through current flowing through a circuit to which the signal is inputted; determining that the signal is in the first state when the through current is detected; and determining that the signal is in the second state when the through current is not detected in a predetermined period of time.

A signal detecting device according to the present invention is a signal detecting device for detecting input of a signal to an input terminal, and characterized by comprising detecting means for detecting a through current flowing through a circuit to which the signal is inputted, wherein the signal detecting device detects input of the signal, based on whether or not the through current flowed through the circuit.

A signal detecting device according to the present invention is a signal detecting device for detecting whether a signal inputted to an input terminal is in a first state in which the signal repeatedly goes to a high level and a low level alternately, or in a second state in which the signal is kept at a high level or a low level, and characterized by comprising detecting means for detecting a through current flowing through a circuit to which the signal is inputted, wherein the signal detecting device determines the signal is in the first state when the detecting means detects the through current, and determines the signal is in the second state when the detecting means does not detect the through current in a predetermined period of time.

A signal detecting device according to the present invention is characterized in that the circuit includes a p-type transistor and an n-type transistor with gates to which the signal is inputted.

A frequency detecting device according to the present invention is a frequency detecting device for detecting a frequency of a signal inputted to an input terminal, and characterized by comprising detecting means for detecting a through current flowing through a circuit to which the signal is inputted, wherein the frequency detecting device detects the frequency, based on the through current detected by the detecting means.

A frequency detecting device according to the present invention is characterized in that the circuit includes a p-type transistor and an n-type transistor with gates to which the signal is inputted.

A power consumption control device according to the present invention is a power consumption control device for detecting input of a signal outputted from an operation monitoring target to an input terminal, and outputting a power consumption reduction signal when the signal is not detected in a predetermined period of time, and characterized by comprising detecting means for detecting a through current flowing through a circuit to which the signal is inputted, wherein the power consumption control device outputs the power consumption reduction signal when the through current is not detected in a predetermined period of time.

A power consumption control device according to the present invention is a power consumption control device for determining whether a signal outputted from an operation monitoring target and inputted to an input terminal is in a first state in which the signal repeatedly goes to a high level and a low level alternately, or in a second state in which the signal is kept at a high level or a low level, and outputting a power consumption reduction signal when the signal is determined as being in the second state, and characterized by comprising detecting means for detecting a through current flowing through a circuit to which the signal is inputted, wherein the power consumption control device determines the signal is in the first state when the detecting means detects the through current, and determines the signal is in the second state when the detecting means does not detect the through current in a predetermined period of time.

An electronic apparatus according to the present invention is characterized by comprising: the power consumption control device; a device as an operation monitoring target, which outputs a signal to the power consumption control device when it is operating; and a power supply control device for executing a power supply stopping process or a power supply reducing process for the operation monitoring target, according to the power consumption reduction signal outputted from the power consumption control device.

An electronic apparatus according to the present invention is characterized by comprising: the power consumption control device; a device as an operation monitoring target, which outputs a signal to the power consumption control device, causes the signal to be in a first state in which the signal repeatedly goes to a high level and a low level alternately when it is operating, and causes the signal to be in a second state in which the signal is kept at a high level or a low level when it is not operating; and a power supply control device for executing a power supply stopping process or a power supply reducing process for the operation monitoring target, according to the power consumption reduction signal outputted from the power consumption control device.

In the present invention, a signal inputted to the input terminal is applied to the gates of a p-type transistor and an n-type transistor connected in series, such as CMOS, for example, to detect a through current flowing through the p-type transistor and n-type transistor. Since the through current is generated at an intermediate potential between potentials at which ON/OFF of the p-type transistor and n-type transistor is switched, it is generated when the signal switches to a low level from a high level, or switches to a high level from a low level. Therefore, the presence or absence of an input signal can be detected based on the presence or absence of the through current. Moreover, since the through current is almost proportional to the number of times of ON/OFF switching of the input signal, the frequency of the input signal can be detected based on the through current.

In the present invention, a signal inputted to the input terminal is applied to the gates of a p-type transistor and an n-type transistor connected in series, such as CMOS, for example, to detect a through current flowing through the p-type transistor and n-type transistor, and when the through current is detected, the signal is determined as being in the first state in which the signal repeatedly goes to a high level and a low level alternately, while when the through current is not detected in a predetermined period of time, the signal is determined as being in the second state in which the signal is kept at a high level or a low level. Since the through current is generated at an intermediate potential between potentials at which ON/OFF of the p-type transistor and n-type transistor is switched, it is generated when the signal switches to a low level from a high level, or switches to a high level from a low level. Therefore, based on the presence or absence of the through current, it is possible to detect whether the signal is switched between high level and low level (the first state), or not (the second state). Moreover, even when the signal is kept at a high level or a low level, it is possible to detect the second state without problem.

In the present invention, a signal inputted to the input terminal is applied to the gates of a p-type transistor and an n-type transistor connected in series, such as CMOS, for example, to detect a through current flowing through the p-type transistor and n-type transistor, and when the though current is not detected in a predetermined period of time, a power consumption reduction signal is outputted. Since the through current is generated at an intermediate potential between potentials at which ON/OFF of the p-type transistor and n-type transistor is switched, it is generated when the signal switches to a low level from a high level, or switches to a high level from a low level. Therefore, based on the presence or absence of the through current, it is possible to detect the presence or absence of a signal inputted from an operation monitoring target and detect whether the operation monitoring target is operating or is stopped. Moreover, since the through current is almost proportional to the number of times of ON/OFF switching of the input signal, the frequency of the input signal can be detected based on the through current.

In the present invention, a signal inputted to the input terminal is applied to the gates of a p-type transistor and an n-type transistor connected in series, such as CMOS, for example, to detect a through current flowing through the p-type transistor and n-type transistor, and when the through current is detected, the signal is determined as being in the first state in which the signal repeatedly goes to high level and low level alternately, while when the through current is not detected in a predetermined period of time, the signal is determined as being in the second state in which the signal is kept at a high level or a low level. Since the through current is generated at an intermediate potential between potentials at which ON/OFF of the p-type transistor and n-type transistor is switched, it is generated when the signal switches to a low level from a high level, or switches to a high level from a low level. Therefore, based on the presence or absence of the through current, it is possible to detect whether the signal is switched between high level and low level (the first state), or not (the second state), and it is possible to detect an operation state of the operation monitoring target (for example, the first state indicates that the apparatus is operating, and the second state indicates that the apparatus is stopped). Moreover, even when the signal is kept at a high level or a low level, it is possible to detect the second state without problem.

In the present invention, by executing a power supply stopping process or a power supply reducing process according to a power consumption reduction signal outputted from the power consumption control device, it is possible to reduce power consumption of the electronic apparatus.

The above and further objects and features of the invention will more fully be apparent from the following detailed description with accompanying drawings.

BRIEF DESCRIPTION OF THE SEVERAL VIEWS OF THE DRAWINGS

FIG. 3 is a circuit diagram showing the essential structure of an electronic apparatus comprising a power consumption control device according to the present invention;

DETAILED DESCRIPTION OF THE INVENTION

Figure 1:
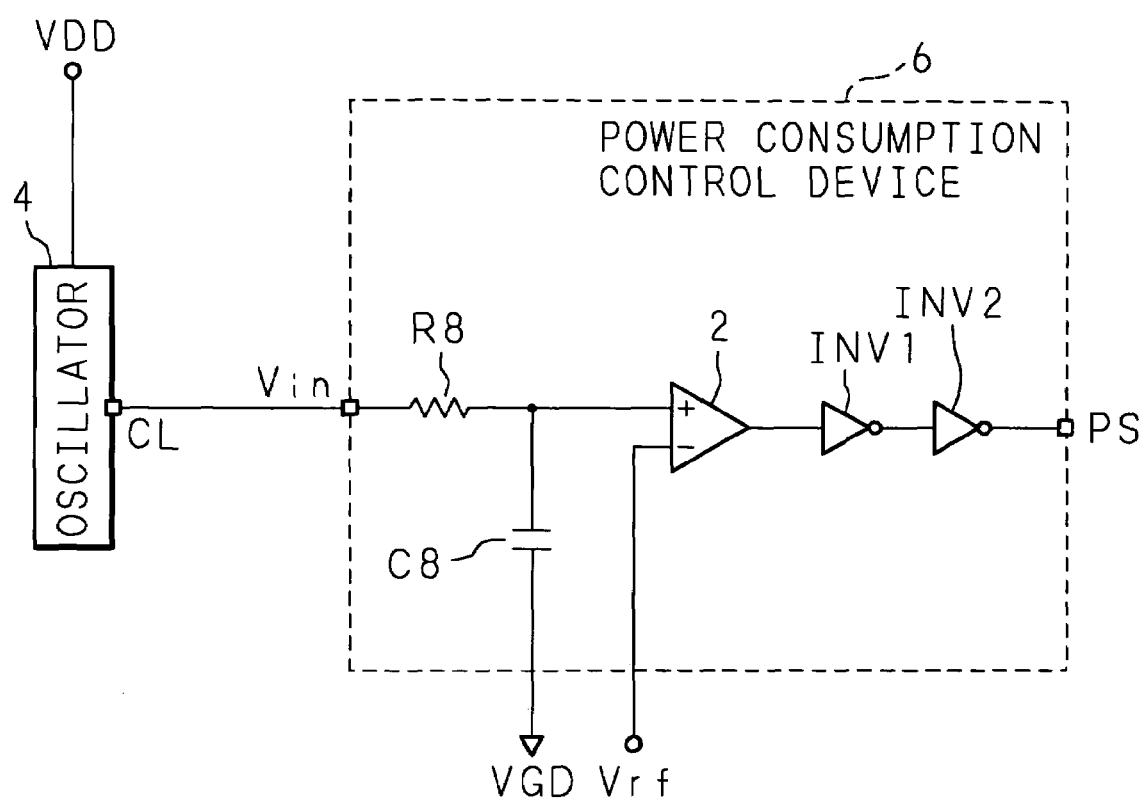
FIG. 1 is a circuit diagram showing the essential structure of an electronic apparatus comprising a conventional power consumption control device.
Figure 2:
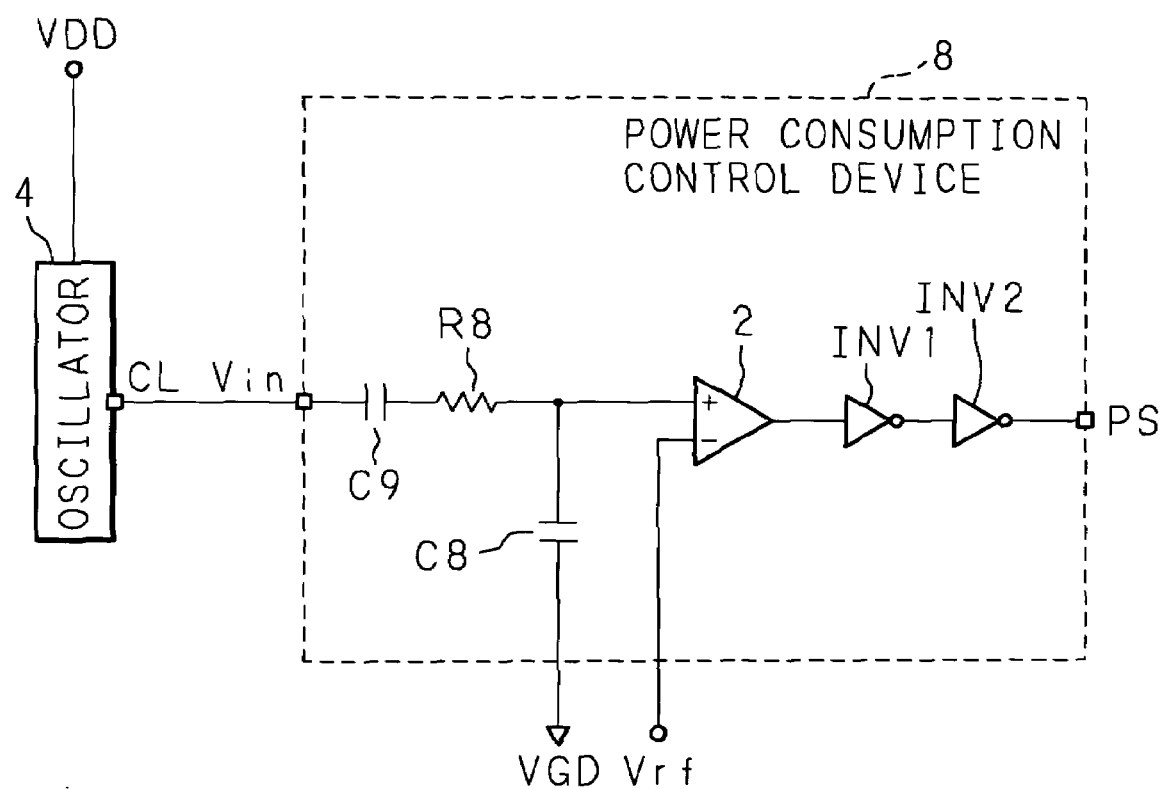
FIG. 2 is a circuit diagram showing the essential structure of an electronic apparatus comprising another conventional power consumption control device.

The following description will specifically explain the present invention, based on the drawings illustrating an embodiment thereof.

FIG. 3 is a circuit diagram showing the essential structure of an electronic apparatus comprising a power consumption control device according to the present invention. The electronic apparatus comprises an oscillator 4 which is an operation monitoring target, and a power consumption control device 12. The power consumption control device 12 comprises a signal detecting section 10 (signal detecting device or a signal state determining device), a comparator 2, and inverters INV1 and INV2. The oscillator 4 has an output terminal CL for outputting a clock signal (pulse signal) similar to a signal to be supplied to a pre-scaler (not shown). Moreover, the oscillator 4 is connected to a voltage terminal VDD.

The signal detecting section 10 of the power consumption control device 12 has a p-type transistor M1, a p-type transistor M2 and an n-type transistor M3 connected in series from the higher potential side between the voltage terminal VDD and ground terminal VGD. More specifically, the source of the transistor M1 is connected to the voltage terminal VDD, the source of the transistor M2 is connected to the drain of the transistor M1, the drain of the transistor M2 is connected to the drain of the transistor M3, and the source of the transistor M3 is connected to the ground terminal VGD. Further, in parallel with these transistors, a p-type transistor M0 and a resistor R1 are connected in series from the higher potential side, and a capacitor C1 is connected to the resistor R1 in parallel. More specifically, the source of the transistor M0 is connected to the voltage terminal VDD, and the drain of the transistor M0 is connected to the resistor R1 and capacitor C1. Moreover, the gates of the transistors M0 and M1 are both connected between the transistor M1 and the transistor M2. Further, the gates of the transistors M2 and M3 are both connected to the output terminal CL of the oscillator 4 through an input terminal Vin. The transistors M0, M1, resistors R1 and capacitor C1 act as detecting means for detecting a through current flowing through the p-type transistor M2 and n-type transistor M3 connected in series.

An output terminal Vout between the transistor M0 and resistor R1 of the signal detecting section 10 is connected to the non-inverted input terminal of the comparator 2 of the power consumption control device 12. Moreover, a reference voltage terminal Vrf is connected to the inverted input terminal of the comparator 2, and the output terminal of the comparator 2 is connected to a power save signal output terminal PS through the two inverters INV1 and INV2. The power save signal output terminal PS can be connected, for example, to a power supply control device (not shown) and give a power save signal (power consumption reduction signal) to the power supply control device so as to stop power supply to the pre-scaler (power supply stopping process) or reduce the supply voltage (power supply reducing process), or can be connected, for example, to a power supply control device in the pre-scaler and give a power save signal to the power supply control device so as to stop operation (power supply stopping process) or cause the power supply to stand by (power supply reducing process).

Figure 4A:
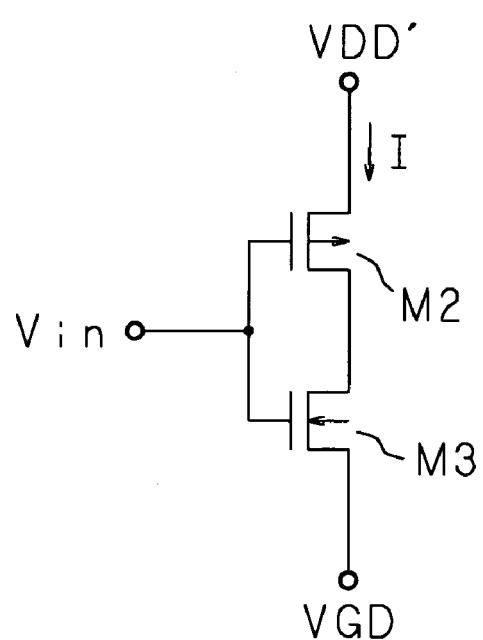
FIG. 4A is a connection diagram of transistors M2 and M3.
Figure 4B:
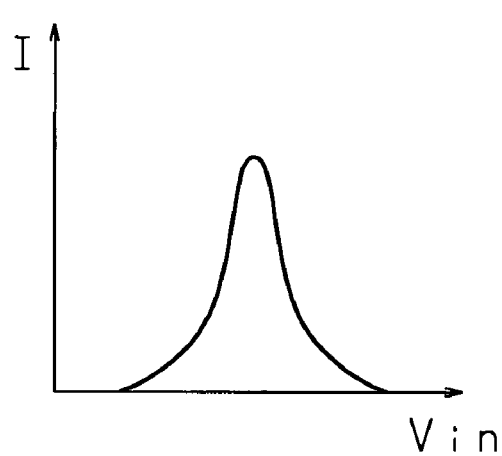
FIG. 4B is a characteristic view showing the voltage of clock signal and the through current flowing through the transistors M2 and M3.
Figure 5:
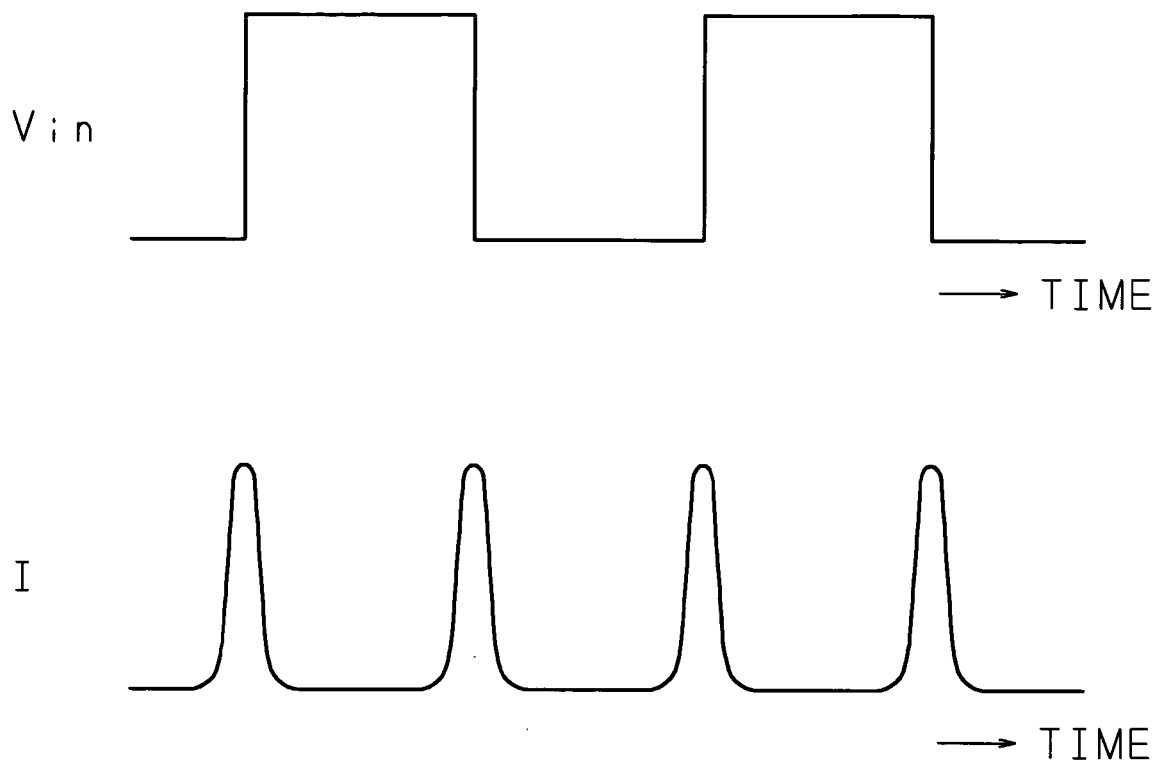
FIG. 5 is a timing chart of the voltage of clock signal and the through current.

FIG. 4A, FIG. 4B and FIG. 5 are views for explaining a through current that flows through the transistors M2 and M3 during ON/OFF switching. FIG. 4A is a connection diagram of the transistors M2 and M3, FIG. 4B is a characteristic view showing the voltage of clock signal and the through current flowing through the transistors M2 and M3, and FIG. 5 is a timing chart of the clock signal and the through current. When the voltage Vin of the clock signal inputted to the gates of the transistors M2 and M3 (the voltage of the input terminal Vin) is in a high or low state, one of the transistors M2 and M3 is on and the other is off, and therefore a current I does not flow through the transistors M2 and M3. However, at an intermediate potential between potentials at which ON/OFF is switched, both transistors M2 and M3 are on, and the current I (through current) flows. Thus, as shown in FIG. 5, the through current flows during the rise and fall of the clock signal.

When a clock signal is inputted to the gates and a through current flows through the transistors M2, M3 and the transistor M1, the current also flows through the transistor M0 which forms a current mirror with the transistor M1 and is converted into a voltage by the resistor R1, and further the electric potential is retained by the capacitor C1 and the output terminal Vout goes to a high state.

On the other hand, when the clock signal is stopped, the through current does not flow through the transistors M2 and M3 irrespective of whether the clock signal is stopped in a high state or a low state, and the charge in the capacitor C1 is soon discharged by the resistor R1, and therefore the output terminal Vout immediately goes to a low state. Accordingly, the signal detecting section 10 can detect the presence or absence of an input clock signal (pulse signal) irrespective of the stopped state. Moreover, the signal detecting section 10 can determine whether the input signal is in a first state in which the signal repeatedly goes to high and low alternately, or in a second state in which the input signal is stopped at a high or low level.

Figure 6A:
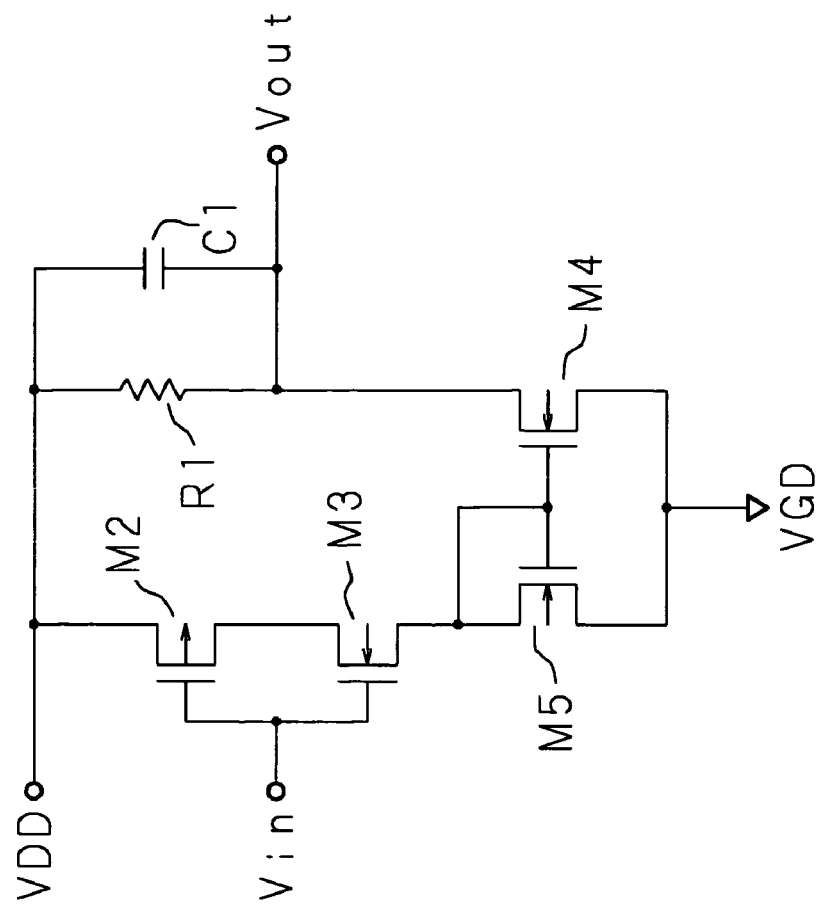
FIG. 6A and FIG. 6B are circuit diagrams showing another example of the structure of a signal detecting section.
Figure 6B:
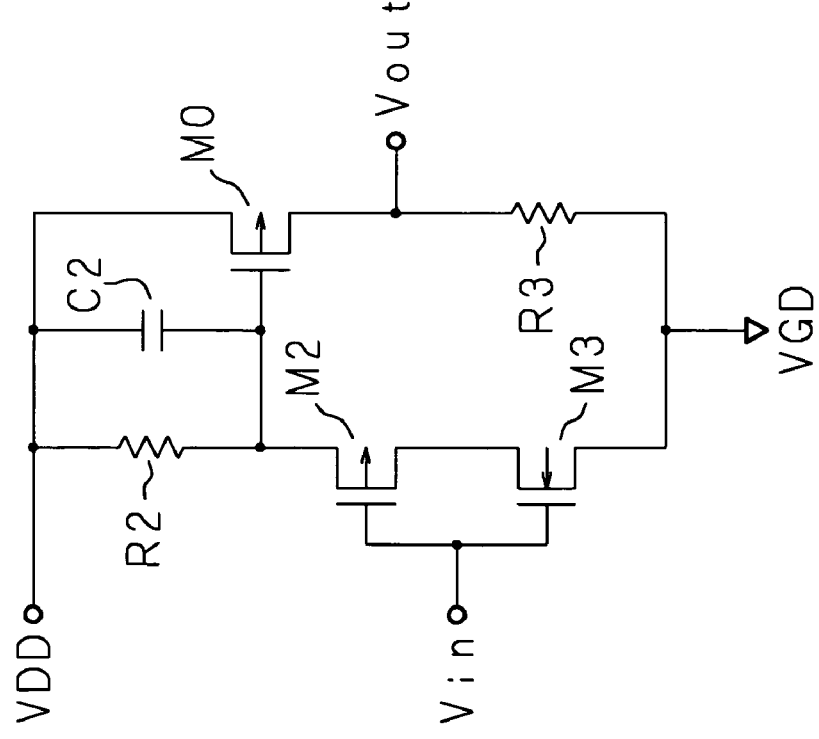

Since the signal detecting section (signal detecting device or signal state determining device) 10 is sufficient if it can detect the presence/absence or state of an input signal by using a through current generated during HIGH/LOW switching of the signal inputted to the gates of the transistors M2 and M3, it is possible to use an arbitrary method to detect the generated through current. FIG. 6A and FIG. 6B are circuit diagrams showing another example of the structure of the signal detecting section. For example, as shown in FIG. 6A, it may be possible to replace a resistor R2 for the transistor M1 shown in FIG. 3, remove the capacitor C1 and connect a capacitor C2 to the resistor R2 in parallel, or as shown in FIG. 6B, it may be possible to reverse the positive and negative polarities from those shown in FIG. 3. Moreover, it may also be possible to connect the output terminal Vout of the signal detecting section 10 to the base or gate of an arbitrary transistor.

Figure 7:
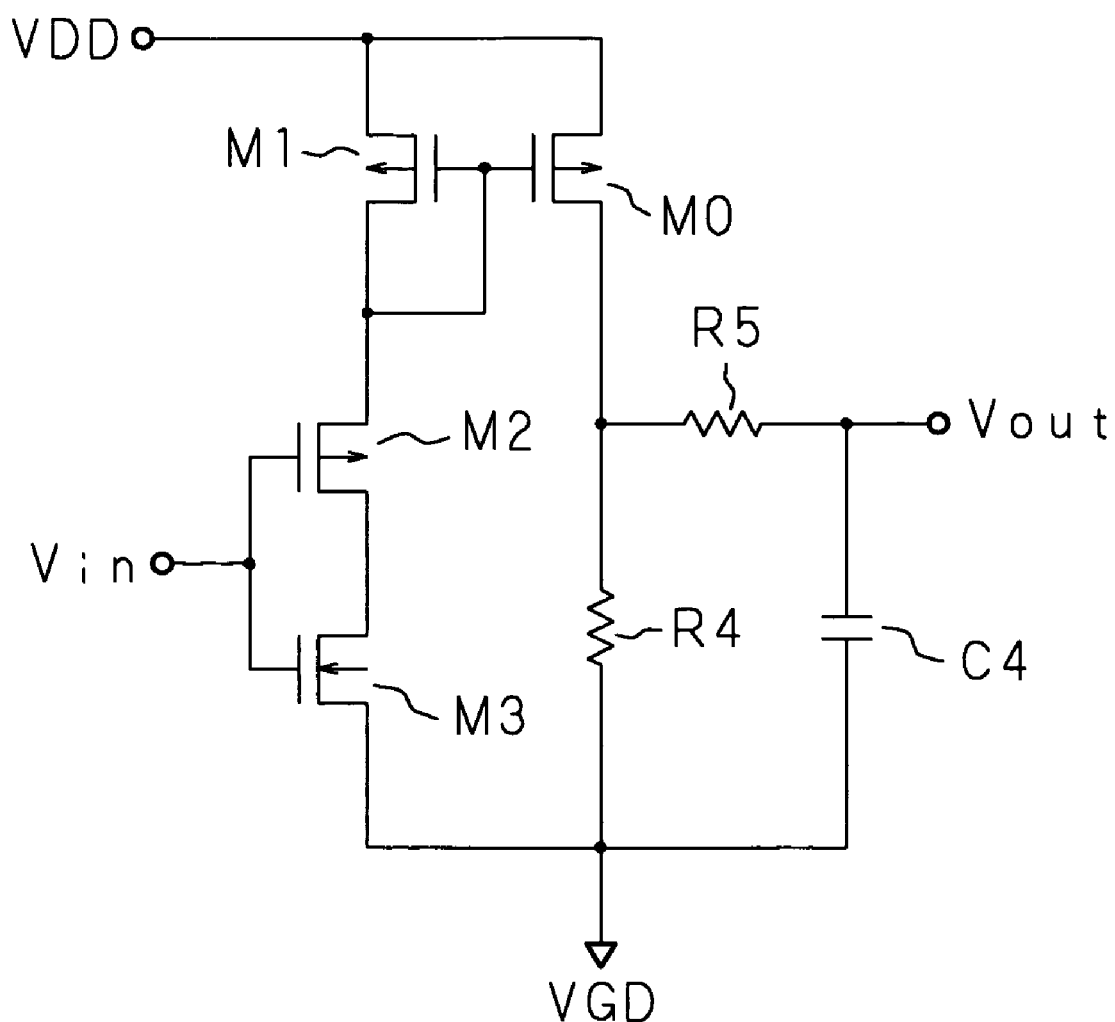
FIG. 7 is a circuit diagram showing still another example of the structure of the signal detecting section.

The signal detecting section (signal detecting device or signal state determining device) 10 is not limited to a power consumption control device, and can be applied to an arbitrary apparatus for detecting the presence or absence of an input signal, or determining the state of an input signal. Besides, as shown in FIG. 5, since a through current is generated during the rise or fall of a clock signal, it may also be possible to detect the frequency of the clock signal based on the through current. The detection of the frequency can be carried out based on the average voltage of the through current I shown in FIG. 5, and, for example, since the voltage at the output terminal Vout of the signal detecting section 10 shown in FIG. 3 is almost proportional to the frequency of the clock signal due to the resistor R1 and capacitor C1, it is possible to detect whether the frequency of the clock signal (the voltage at the output terminal Vout) is higher or lower than a reference frequency (the voltage at the reference voltage terminal Vrf) by the comparator 2. Further, it may be possible to add a frequency filter in the front stage of the output terminal Vout. FIG. 7 is a circuit diagram showing still another example of the structure of the signal detecting section. In FIG. 7, a low-pass filter is added in the front stage of the output terminal Vout of the circuit shown in FIG. 3. Moreover, it may also be possible to use the detected frequency for the control of power consumption so that when the detected frequency is high, the apparatus is operated in a normal power mode, while when the detected frequency is low, the apparatus is operated in a power save mode.

As described in detail above, according to the present invention, it is possible to detect the presence or absence of an input signal to a circuit by a simple structure, based on the presence or absence of a through current flowing in the circuit. Moreover, it is possible to detect the frequency of the input signal by a simple structure, based on the through current. In addition, according to the present invention, whether or not the input signal to the circuit is switched between high level and low level can be detected by a simple structure, based on the presence or absence of a through current flowing in the circuit. Further, according to the present invention, it is possible to detect whether an operation monitoring target is operating or stopped by a simple structure, based on the presence or absence of a through current flowing in the circuit, and it is possible to output a power consumption reduction signal according to the detection result. Moreover, it is possible to reduce power consumption of the electronic apparatus by executing a power supply stopping process or a power supply reducing process according to the power consumption reduction signal.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A signal detection method comprising the steps of:
   detecting a through current flowing through a circuit to which a signal is inputted from an input terminal; and
   detecting input of the signal, based on whether or not the through current flowed through the circuit; wherein
   the circuit includes a p-type transistor and an n-type transistor with gates to which the signal is inputted, and includes a transistor to perform a current mirror function.

2. A signal detection method comprising the steps of:
   detecting a through current flowing through a circuit to which a signal is inputted from an input terminal;
   determining that the signal is in a first state in which the signal repeatedly goes to a high level and a low level alternately when the through current is detected; and
   determining that the signal is in a second state in which the signal is kept at one of a high level and a low level when the through current is not detected in a predetermined period of time.

3. The signal detection method according to claim 2, wherein
   the circuit includes a p-type transistor and an n-type transistor with gates to which the signal is inputted.

4. A frequency detection method comprising the steps of:
   detecting a through current flowing through a circuit to which a signal is inputted from an input terminal; and
   detecting a frequency of the signal, based on the detected through current; wherein
   the circuit includes a p-type transistor and an n-type transistor with gates to which the signal is inputted, and includes a transistor to perform a current mirror function.

5. A power consumption control method comprising the steps of:
   detecting a through current flowing through a circuit to which a signal outputted from an operation monitoring target is inputted from an input terminal;
   determining that the signal is in a first state in which the signal repeatedly goes to a high level and a low level alternately when the through current is detected;
   determining that the signal is in a second state in which the signal is kept at one of a high level and a low level when the through current is not detected in a predetermined period of time; and
   outputting a power consumption reduction signal when the signal is determined as being in the second state.

6. A signal detecting device comprising a detector for detecting a through current flowing through a circuit to which a signal is inputted from an input terminal, wherein
   the signal detecting device detects input of the signal, based on whether or not the through current flowed through the circuit; wherein the circuit includes a p-type transistor and an n-type transistor with gates to which the signal is inputted, and includes a transistor to perform a current mirror function.

7. A signal detecting device comprising a detector for detecting a through current flowing through a circuit to which a signal is inputted from an input terminal, wherein the signal detecting device determines that the signal is in a first state in which the signal repeatedly goes to a high level and a low level alternately when the detector detects the through current, and determines that the signal is in a second state in which the signal is kept at one of a high level and a low level when the detector does not detect the through current in a predetermined period of time.

8. The signal detecting device according to claim 7, wherein the circuit includes a p-type transistor and an n-type transistor with gates to which the signal is inputted.

9. A frequency detecting device comprising a detector for detecting a through current flowing through a circuit to which a signal is inputted from an input terminal, wherein the frequency detecting device detects a frequency of the signal, based on the through current detected by the detector; wherein the circuit includes a p-type transistor and an n-type transistor with gates to which the signal is inputted, and a transistor to perform a current mirror function.

10. A power consumption control device comprising a detector for detecting a through current flowing through a circuit to which a signal outputted from an operation monitoring target is inputted from an input terminal, wherein the power consumption control device determines that the signal is in a first state in which the signal repeatedly goes to a high level and a low level alternately when the detector detects the through current, determines that the signal is in a second state in which the signal is kept at one of a high level and a low level when the detector does not detect the through current in a predetermined period of time, and outputs a power consumption reduction signal when the signal is determined as being in the second state.

11. An electronic apparatus comprising:

a power consumption control device comprising a detector for detecting a through current flowing through a circuit to which a signal outputted from an operation monitoring target is inputted from an input terminal, wherein the power consumption control device determines that the signal is in a first state in which the signal repeatedly goes to a high level and a low level alternately when the detector detects the through current, determines that the signal is in a second state in which the signal is kept at one of a high level and a low level when the detector does not detect the through current in a predetermined period of time, and outputs a power consumption reduction signal when the signal is determined as being in the second state;

a device as an operation monitoring target, which outputs a signal to the power consumption control device, causes the signal to be in a first state in which the signal repeatedly goes to a high level and a low level alternately when it is operating, and causes the signal to be in a second state in which the signal is kept at one of a high level and a low level when it is not operating; and a power supply control device for executing one of a power supply stopping process and a power supply reducing process for the operation monitoring target, according to the power consumption reduction signal outputted from the power consumption control device.

12. The signal detection method according to claim 3, wherein the circuit includes a transistor to perform a current mirror function.

13. The signal detection device of claim 8, wherein the circuit includes a transistor to perform a current mirror function.

* * * * *